(12) United States Patent
Panov

(10) Patent No.: US 8,474,269 B2
(45) Date of Patent: Jul. 2, 2013

(54) METHOD OF DETECTING A PARTIAL FLAME FAILURE IN A GAS TURBINE ENGINE AND A GAS TURBINE ENGINE

(75) Inventor: Vili Panov, Lincoln (GB)

(73) Assignee: Siemens Aktiengesellschaft, München (DE)

( * ) Notice: Subject to any disclaimer, the term of this patent is extended or adjusted under 35 U.S.C. 154(b) by 1006 days.

(21) Appl. No.: 12/524,788

(22) PCT Filed: Jan. 28, 2008

(86) PCT No.: PCT/EP2008/050943
§ 371 (c)(1),
(2), (4) Date: Jul. 28, 2009

(87) PCT Pub. No.: WO2008/092822
PCT Pub. Date: Aug. 7, 2008

(65) Prior Publication Data
US 2010/0024431 A1 Feb. 4, 2010

(30) Foreign Application Priority Data
Jan. 30, 2007 (EP) .................................... 07002015

(51) Int. Cl.
*F02C 9/28* (2006.01)
(52) U.S. Cl.
USPC .............................. 60/779; 60/39.091; 431/75
(58) Field of Classification Search
CPC ....................................................... F02C 9/28
USPC ........... 60/223, 238, 779, 39.091, 803, 39.37; 431/24, 66, 50, 80, 75
See application file for complete search history.

(56) References Cited

U.S. PATENT DOCUMENTS

| 3,747,340 | A | 7/1973 | Arbor | |
|---|---|---|---|---|
| 4,115,998 | A * | 9/1978 | Gilbert et al. | 60/39.091 |
| 4,283,634 | A | 8/1981 | Reed et al. | |
| 5,537,864 | A * | 7/1996 | Sood | 73/112.01 |
| 5,551,227 | A | 9/1996 | Harrison et al. | |
| 6,442,943 | B1 | 9/2002 | Harrison et al. | |
| 2006/0053802 | A1* | 3/2006 | Sasao et al. | 60/772 |
| 2007/0089424 | A1* | 4/2007 | Venkataramani et al. | 60/773 |

FOREIGN PATENT DOCUMENTS

| EP | 1637805 A2 | 3/2006 |
|---|---|---|
| GB | 2282221 A | 3/1995 |
| RU | 008087 U1 | 10/1998 |
| RU | 2183795 C2 | 6/2002 |
| RU | 42625 U1 | 12/2004 |

* cited by examiner

*Primary Examiner* — Andrew Nguyen

(57) ABSTRACT

A method of detecting a partial flame failure in a gas turbine is provided. The method includes a gas duct to guide a propulsion gas and several combustors, each combustor leads into the gas duct and includes a burner. The method includes measuring a first temperature over time at each of at least two probing points located downstream from the combustors in the gas duct, measuring a second temperature over time in each of at least two of the burners, and detecting a partial flame failure from the first temperature measurements and the second temperature measurements, wherein the detecting of a partial flame failure includes determining a first detection parameter, the first detection parameter is determined from a rate of change of a variation between the first temperature measurements at different probing points. A gas turbine including temperature sensors to detect a partial flame failure is also provided.

16 Claims, 3 Drawing Sheets

METHOD OF DETECTING A PARTIAL FLAME FAILURE IN A GAS TURBINE ENGINE AND A GAS TURBINE ENGINE

CROSS REFERENCE TO RELATED APPLICATIONS

This application is the US National Stage of International Application No. PCT/EP2008/050943, filed Jan. 28, 2008 and claims the benefit thereof. The International Application claims the benefits of European Patent Office application No. 02020602.5 EP filed Jan. 30, 2007, both of the applications are incorporated by reference herein in their entirety.

FIELD OF INVENTION

This invention relates to a method of detecting a partial flame failure in a gas turbine engine having a gas duct for guiding propulsion gas and several combustors, each of which combustors leads into the gas duct and comprises a burner. The invention further relates to a gas turbine engine of the mentioned type.

BACKGROUND OF INVENTION

In such a gas turbine engine known in the state of the art the gas duct or gas flow path is routed through a combustion section located between a compressor and a turbine section. The combustion section may include an annular array of combustors. High pressure air from the compressor flows through the combustion section where it is mixed with fuel and burned. As mentioned above, the combustors each comprise a burner for igniting the air/fuel mixture especially during start up of the gas turbine engine.

Combustion gases exit the combustion section to power the turbine section which drives the compressor. In single-shaft arrangements a high-pressure and a low-pressure turbine of the turbine section are mechanically connected and together drive an output power shaft. In twin-shaft arrangements a low-pressure turbine (power turbine) is mechanically independent, i.e. only drives the output power shaft, and a high-pressure turbine, or so called compressor turbine, drives the compressor. This combination acts as a gas generator for the low-pressure turbine. The combustion gases exit the turbine section through an exhaust duct.

A partial flame failure is defined as a flame failure in a subset of combustors, i.e. in one or more but not all combustors. Flame failure in all combustors would be considered a full flame failure. In case of such a partial flame failure, not all of the fuel supplied is burned in the combustion section, which leads to a suffering of the overall engine performance and efficiency. In the event of a partial flameout, fuel continues to be introduced by the control system into the combustion section in an attempt to meet demand. Adding fuel to a combustion section which is not completely burned has the adverse effect of producing a high level of emissions and unburned hydrocarbons. Moreover, this introduction of unburnt fuel into air produces an flammable mixture which could be ignited by any hot spot or spark and can lead to a subsequent explosion in the exhaust duct.

Various systems have been developed to detect partial flame failure conditions in a gas turbine engine. These systems include flame detection measurement systems which deploy infrared (IR) and ultraviolet (UV) sensors to detect the presence or absence of a flame at predetermined locations. This type of detection systems depends very much on the location of the sensors and can incorrectly identify absence of flame. Further, the flame detectors occasionally suffer the disadvantage of oil or smoke fouling, causing detection to fail. Moreover, these flame detection systems are generally expensive to supply and maintain.

GB 2 282 221 A describes a flame detector for a gas turbine engine. The flame detector comprises a first temperature sensor and a second temperature sensor which are both arranged to detect the ambient temperature outside the combustor. In addition, the second temperature sensor is arranged to also detect radiant heat from the combustion chamber. The first temperature sensor and the second temperature sensor are located in a first hollow member and a second hollow member, respectively. While the first hollow member is open towards an air stream the second hollow member is not only open towards the air stream but also towards a direction which allows a direct sight onto the flame in the combustion chamber through an aperture for introducing dilution air into the combustion chamber. Heat from the air streaming into the combustor chamber can be transferred convectively to both temperature sensors. In addition to the convective heat transfer, radiant heat from the flame inside the combustion chamber can be transferred to the second temperature sensor through the aperture. In case of successful ignition the flame within the combustion chamber generates radiant heat which can be sensed by the second temperature sensor but not by the first temperature sensor so that both temperature sensors measure different temperature values. In case ignition was not successful, both temperature sensors measure only heat transferred convectively from the air stream so that both measure the same temperature.

EP 1 637 805 A2 describes an ignition detecting method for a gas turbine. In this method, a variation of the temperature measured downstream of the turbine over time is used for judging whether ignition was successful.

U.S. Pat. No. 4,283,634 describes implementing a partial flameout detection method with a multi-shaft turbine.

SUMMARY OF THE INVENTION

It is a first objective of the present invention to provide a method of detecting a partial flame failure in a gas turbine engine, by means of which the above-mentioned shortcomings can be mitigated, and especially a more reliable detection of a partial flame failure, in particular during start-up and loading operation, is facilitated. It is a second objective of the invention to provide an advantageous gas turbine engine.

The first objective is achieved, according to the present invention, by providing a method of detecting a partial flame failure in a gas turbine engine having a gas duct for guiding propulsion gas and several combustors, each of which combustors leads into the gas duct and comprises a burner. The method comprises the steps of: measuring a first temperature over time at each of at least two probing points located downstream from the combustors in the gas duct, and preferably at each of at least three such probing points; measuring a second temperature over time in each of at least two of the burners, and preferably in each of at least three of the burners; and detecting a partial flame failure from the first temperature measurements and the second temperature measurements, wherein said detecting of a partial flame failure includes the step of determining a first detection parameter, said first detection parameter being determined from a rate of change of a variation between said first temperature measurements at different probing points. In particular, measuring the second temperature over time in each of at least two of the burners could take place in the pilot burners.

The second objective is achieved, according to the present invention, by providing a gas turbine engine having a gas duct for guiding propulsion gas and several combustors, each of which combustors leads into the gas duct and comprises a burner, wherein the gas duct contains a first temperature sensor at each of at least two probing points located downstream from the combustors, and preferably at each of at least three such probing points, each temperature sensor being adapted for measuring a first temperature over time. Each of at least two of the burners, and preferably each of at least three of the burners, contains a second temperature sensor (e.g. in the pilot burners) for measuring a second temperature over time. The gas turbine engine further contains evaluation means for detecting a partial flame failure from the first temperature measurements and the second temperature measurements.

In other words, first temperature sensors are positioned at least two probing points in the gas duct in an area downstream from the combustors, i.e. in the area of the turbine section or further downstream. Advantageously, the number of first temperature sensors in the gas duct ranges from 12 to 16. However, more than 16 or less than 12 temperature sensors could also be used. The temperature sensors in the gas duct monitor the temporal behaviour of so called first temperature values. Furthermore, second temperature sensors are placed in at least two of the burners, advantageously in all of the burners, for example 6 to 8 burners. However, this is not meant to be restrictive, as more than 8 or less than 6 burners may be present. The temperature sensors in the burners measure a temporal behaviour of so called second temperature values. From the first temperature measurements and the second temperature measurements it can be determined as to whether a partial flame failure has occurred, i.e. whether a flame failure in a subset of combustors has occurred. During error free operation of the gas turbine engine, each combustor contains a flame.

The invention is based on the insight, that by measuring the first temperatures over time at different probing points the temporal development of the uniformity of the thermal field in the gas duct can be monitored. Partial flame failure is generally followed by an increase in non-uniformity of the thermal field in the gas duct. Therefore, it is possible to retrieve a first indication of a partial flame failure from the first temperature values.

The invention is further based on the insight, that furthermore partial flame failure is followed by a divergence of temperature gradients in the burners, in particular in the burner tips. This results in an increase in the variation of temperature measurements in the various burners. Therefore, measuring the second temperatures in the burners, e.g. in the pilot burners, provides an additional indication of a partial flame failure.

Combining the first temperature measurements and the second temperature measurements according to the invention allows a particularly reliable detection of partial flame failure. This is as differences in the dynamic behaviour between the second temperature sensors in the burners and the first temperature sensors in the gas duct in response to temperature changes in the gas stream and the fact, that the gas duct temperature changes during start-up, can be significant. The gas path temperature changes briefly due to fuel or bleed modulation and combustion dynamic behaviour etc. even without a flameout in an individual can occurring. Therefore, combining the first temperature measurements and the second temperature measurements according to the invention takes into account the dynamic nature of these parameters and leads to a more reliable detection of the partial flame failure, and a false detection of partial flame failure is largely prevented.

According to the inventive solution partial flame failures during start-up of the engine are detected with higher reliability. This allows to prevent spurious detection of flame failures leading to a reduced number of start shutdowns of the engine. The reduced number of start shutdowns leads to an increased life expectancy of the gas turbine engine and improves its performance in general. Further the detection system according to the invention can be retrofitted in existing gas turbine engine installations.

Advantageously, the temperature sensors for conducting the temperature measurements comprise thermocouples. Thermocouples used in the gas duct should have a low thermal capacity and therefore a high response rate, so they are a good representation of the thermal field in the gas duct at any operating condition.

In an advantageous embodiment the detection of a partial flame failure includes the step of determining a first detection parameter which is determined by a rate of change of a variation between the first temperature measurements at different probing points. Thereby a temporal change of the temperature pattern between the different probing points in the gas duct is monitored. Advantageously, the first detection parameter is determined by the rate of change of the standard deviation of the first temperature measurements at the different probing points. That means, the standard deviation between the temperatures measured at the different probing points in the gas duct is calculated for each sample, i.e. each time point of the measurements. From the change of the variation, especially the standard deviation, over time the rate of change is calculated. The variation or standard deviation of the first temperature sensors in the gas duct provides the system with information of the uniformity of the thermal field in the gas duct. In case of a ideally uniform distribution of the thermal field (all thermocouples in the gas duct with the same temperature), the standard deviation has the value of zero. A partial flame failure event is followed by an increase in the non-uniformity of the thermal field in the duct and this results in an increase in the standard deviation. An increase in the variation or the standard deviation can have different causes (for example discrepancy in combustors efficiency) but the flameout is recognisable with characteristic high duct thermal field deformation velocity—high rate of change of the variation or standard deviation.

It is further advantageous if the first detection parameter, which in the following is designated as $D1$, is determined by calculating a smoothed rate of the change of a variation between the first temperature measurements at different probing points. It is further advantageous if the first detection parameter $D1$ is calculated in detail as follows:

$$D1 = ES1_t' = w_1 * AS1_t' + d_1 * ES1_{t-\Delta t}', \quad (1)$$

where $ES1_t'$, is the estimated value for the rate of change of the standard deviation between the first temperature measurements at different probing points for a current time step, $AS1_t'$ is the actual value for the rate of change of standard deviation between the first temperature measurements at different probing points for the current time step, $ES1_{t-\Delta t}'$ is the estimated value for the rate of change of the standard deviation between the first temperature measurements at different probing points for the previous time step, $w_1$ is a weight factor, and $d_1 = (1-w_1)$ is a damping factor.

The damping factor may have a value of around 0,7. However, the appropriate damping factor may depend, inter alia, on monitoring sample rate and/or the type of the used thermocouple.

In a further advantageous embodiment the detecting of a partial flame failure includes the step of determining a second detection parameter which is determined from a variation between the rates of change of the second temperature measurements in different burners. The second detection parameter advantageously is the standard deviation of the rates of change of the second temperature measurements in different burners. When the flame is present in a combustor a positive, but modest rate of change of the temperature sensor in the respective burner occurs. By calculating the second detection parameter from the rates of change of the second temperature measurements, instead of calculating the second parameter from the actual temperatures, a more precise indication of the presence of a flame in respective combustive cans can be obtained. Differences in temperatures between different burners, especially burner tips, during start-up could sometimes be misleading as they are a result of the combined influence of the individual flame lit and the initial temperature of the individual burner. So, a lower burner tip temperature can be caused by late light up, compared with other burners, or even a burner which has just been changed on a hot engine. By calculating the variation or standard deviation between the rates of change information on the combustion synchronicity is provided. In a case in which combustors are ideally synchronised (temperature sensors with the same temperature rate of change) the standard deviation has a value of zero. A partial flame failure event is generally followed by a divergence of burner temperature gradients, especially burner tip temperature gradients, and this results in increasing standard deviation.

In a further advantageous embodiment the second detection parameter is determined by calculating a variation of smoothed rates of change of the second temperature measurements in different burners. Advantageously, the smoothed rates of change $ET2_{j,t}'$ for a respective burner j at a current time step t is calculated as follows:

$$ET2_{j,t}' = w_2 * AT2_{j,t}' + d_2 * ET2_{j,t-\Delta t}', \quad (2)$$

wherein: $ET2_{j,t}'$ is an estimated value for a first derivative of the current time step,
$AT2_t'$ is the actual value for the first derivative for the current time step,
$ET2_{t-\Delta t}'$, is an estimated value for the previous time step,
$w_2$ is a weight factor, and
$d_2=(1-w_2)$ is a damping factor.

The damping factor may, for example, be around 0.9. However, the appropriate damping factor may depend, inter alia, on monitoring sample rate and/or the type of the used thermocouple. From the calculated smoothed rates of change $ET2_{j,t}'$ a variation or a standard deviation is calculated to obtain the second detection parameter D2.

In a further advantageous embodiment the first detection parameter is compared to a first threshold, the second detection parameter is compared to a second threshold and a partial flame failure is declared, if both of the detection parameters exceed the respective threshold. For example, the first threshold ma have a value of around 5° C./s and the second threshold a value of around 0.5° C./s. However, appropriate values for the first and second thresholds may depend, inter alia, on the engine configuration and/or the type of the used thermocouple. Moreover, dynamic thresholds instead of static thresholds could also be used.

It is further advantageous, if a partial flame failure is only declared if both of the detection parameters exceed the respective threshold for a predetermined number of consecutive samples of the respective detection parameter. Advantageously, a number of consecutive samples are used to declare a partial flame failure, e.g. three consecutive samples. However, the most advantageous number of consecutive samples depends on the sample rate. Alternatively, also delay times can be defined for the respective detective parameters, giving a time span over which the detection parameters have to surpass the respective thresholds before a partial flameout failure is declared. This delay time may vary as a function of, inter alia, the sample rate and may, e.g., be around 0.5 seconds for both the first and the second detection parameter.

It is further preferred, if the second temperatures are measured at tips of the respective burners facing into the corresponding combustors. Advantageously, the temperature sensors are embedded within the burner tips, which have a high mass and hence a high thermal inertia. When the flame is present in the combustor heat flow occurs into the burner tip giving a positive, but modest degree of change in temperature of the burner tip sensor.

It is further preferable, if the gas turbine engine comprises a power turbine to be driven by the propulsion gas followed by an exhaust duct, and the at least two probing points for measuring the first temperatures are located in the area of an exit of the power turbine to the exhaust duct. This embodiment is particularly useful for single-shaft gas turbine engines, but can also be applied to twin-shaft engines. In an advantageous embodiment approximately 12 temperature sensors are positioned at the power turbine exit. However, more or less than 12 temperature sensors could also be used.

In a further advantageous embodiment the gas turbine engine comprises a high-pressure turbine and a low-pressure turbine, each turbine being driven by the propulsion gas, as well as an interduct for guiding the propulsion gas from the high-pressure turbine to the low-pressure turbine, and the at least two probing points for measuring the first temperatures are located in the interduct. The positioning of the temperature sensors in the interduct is particularly useful for twin-shaft gas turbine engines but can also be applied to single-shaft engines. A suitable number of temperature sensors in the interduct can for example be approximately 16 temperature sensors. However, invention can also be realised with more or less than 16 temperature sensors.

BRIEF DESCRIPTION OF THE DRAWINGS

A detailed description of the present invention is provided below with reference to the following diagrammatic drawings, in which.

DESCRIPTION OF PREFERRED EMBODIMENTS

Figure 1:
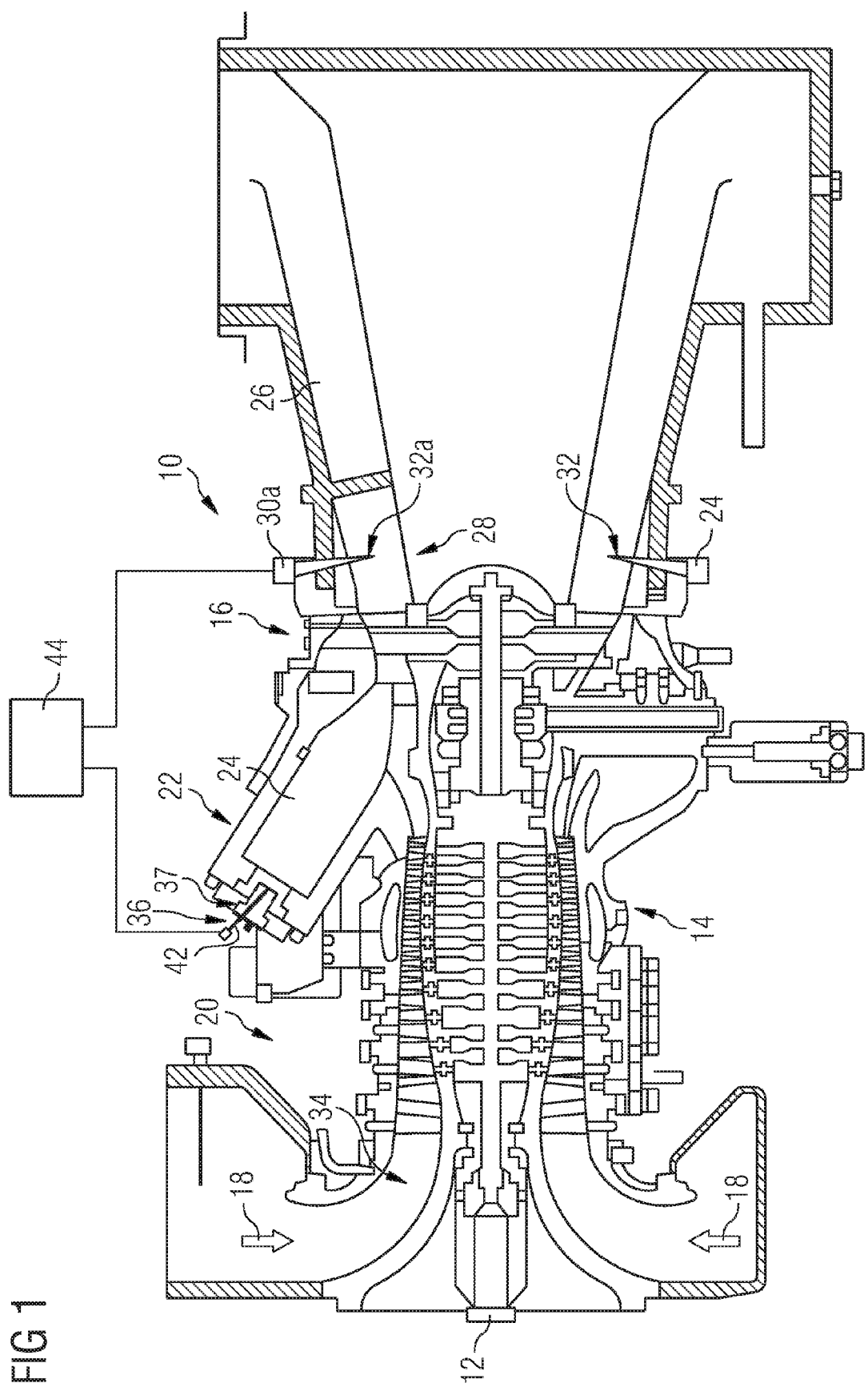
FIG. 1 is a sectional view of a first embodiment of a gas turbine engine according to the invention.

FIG. 1 is a first embodiment of a gas turbine engine 10 in the form of a single-shaft gas turbine engine. The gas turbine engine 10 comprises a single rotor shaft 12 carrying both a compressor 14 and a power turbine 16. A gas duct 34 guides a propulsion gas 18 through the engine 10 starting from an inflow section 20 via the compressor 14, a combustion section 22, the power turbine 16 and an exhaust duct 26.

At the left end of the engine 10 according to FIG. 1 the propulsion gas 18 in the form of air flows via an inflow section 20 into the compressor 14. The compressor 14 thereupon compresses the propulsion gas 18. The propulsion gas 18 then enters the combustion section 22 of the engine 10, in which it is mixed with fuel and ignited in combustors 24. The combustion section 22 contains an annular array of combustors 24, of which only one is shown in FIG. 1 and which lead into the gas duct 34.

The combusted propulsion gas 18 flows through the power turbine 16 expanding thereby and driving the rotor shaft 12. The expanded propulsion gas 18 then enters an exhaust duct 26. At an exit 28 of the power turbine 16 into the exhaust duct 26 several first temperature sensors 30a in the form of so called power turbine exit thermocouples are positioned at different probing points 32a. By placing the first temperature sensors 30a at the power turbine exit 28 the probing points 32a are located downstream from the combustors 24.

Figure 3:
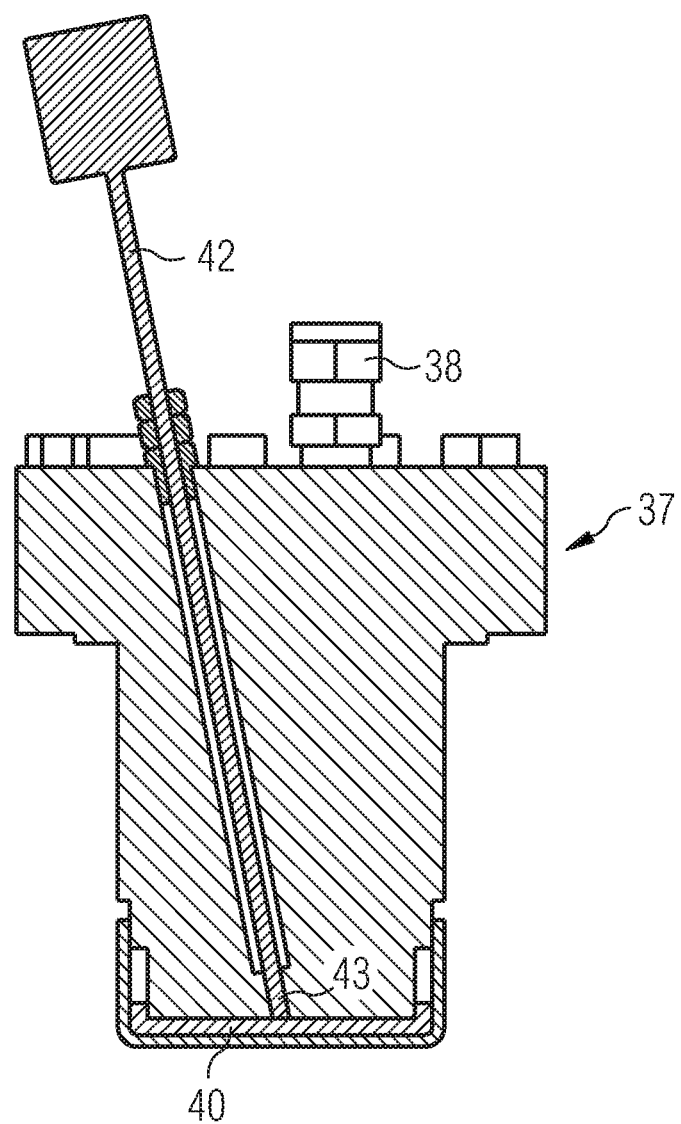
FIG. 3 is a cross-sectional view of a pilot burner contained in the gas turbine engines according to FIGS. 1 and 2.

The combustors 24 each comprise a burner 36 for introducing fuel into the inside of the corresponding combustor 24 and igniting the fuel/air mixture. A burner 36 comprises a pilot burner 37 Such a pilot burner 37 is shown in detail in FIG. 3. The pilot burner 37 contains a fuel inlet 38 for introducing the fuel into the pilot burner 37. The fuel is subsequently guided to a burner face 40 or burner tip of the pilot burner 37. Furthermore, each pilot burner 37 contains a second temperature sensor 42 in the form of a so-called burner tip thermocouple arranged for measuring the temperature at the burner face 40. The temperatures measured over time by the first temperature sensors 30a and the second temperature sensors 42 are evaluated by evaluation means 44. As a result of this evaluation it is decided, if a partial flame failure, i.e. a flame failure in a subset of the combustors 24, has occurred. The evaluation routine will be described later in the text. However, it should be noted, that the thermocouple does not necessarily needed to be located in the pilot burner. Other locations in the burner 36 allowing for measuring the temperature in the burner, in particular in the burner tip, are also possible.

Figure 2:
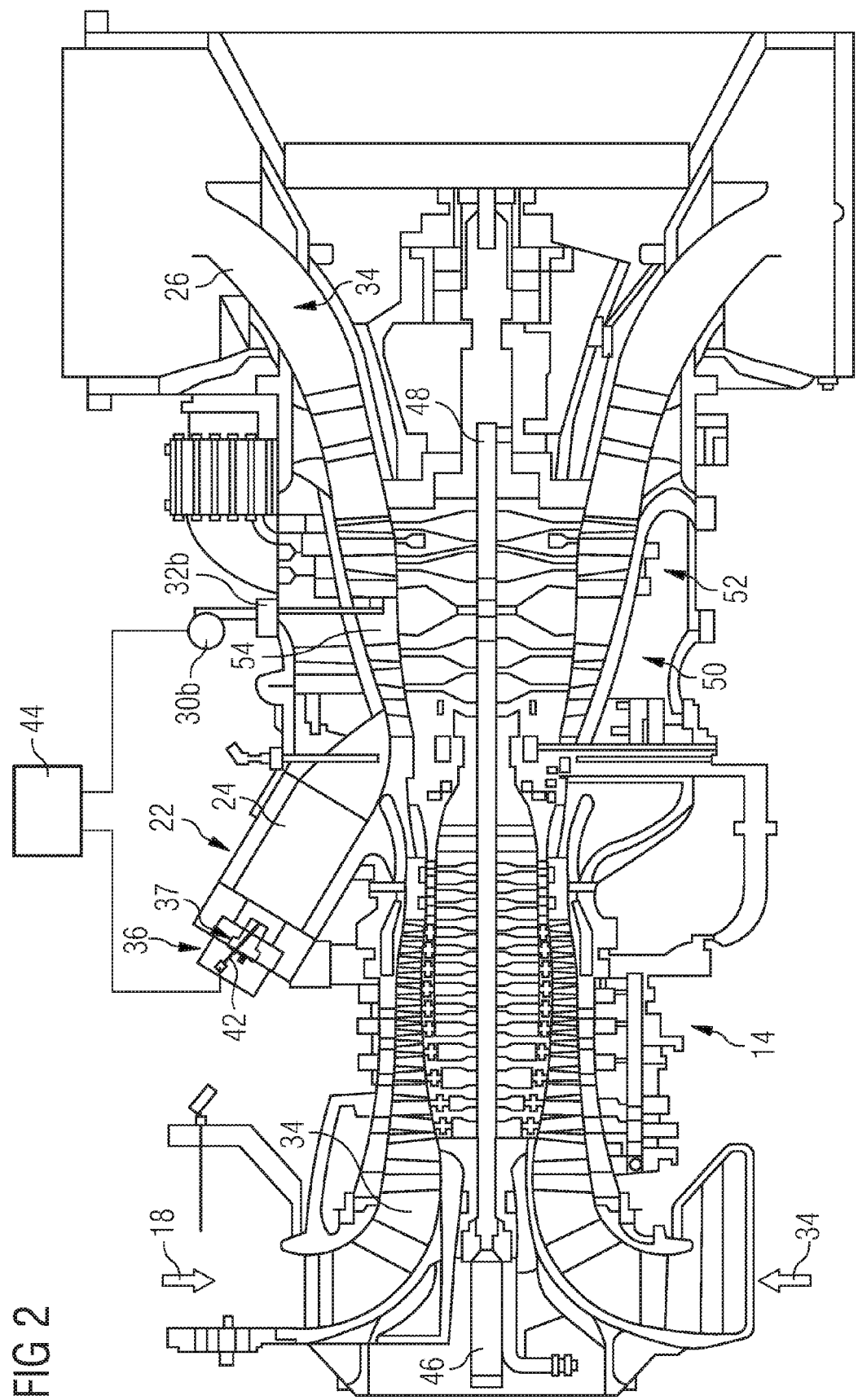
FIG. 2 is a sectional view of a second embodiment of a gas turbine engine according to the invention.

FIG. 2 shows a second embodiment of a gas turbine engine 10 according to the invention, in the form of a so called twin-shaft engine. The gas turbine engine 10 according to FIG. 2 differs from the engine 10 according to FIG. 1 in that two mechanically independent rotor shafts 46 and 48 are contained therein instead of the single rotor shaft 12 according to FIG. 1. The power turbine 16 according to FIG. 1 is in the embodiment according to FIG. 2 split into a high-pressure turbine 50 and a low-pressure turbine 52.

The high-pressure turbine 50 is attached to the first rotor shaft 46 as is the compressor 14. The low-pressure turbine 52 is mounted on the second rotor shaft 48. The gas duct 34 contains an interduct 54 for guiding the propulsion gas 18 from the high-pressure turbine 50 to the low-pressure turbine 52. Instead of an arrangement of the first temperature sensors 30a at the power turbine exit 28 according to FIG. 1, first temperature sensors 30b are arranged at different probing points 32b in the interduct 54 of the engine 10 according to FIG. 2. The second temperature sensors 42 are arranged as in the embodiment according to FIG. 1 in the respective burner faces 40 of the pilot burners 37. Also, the gas turbine engine 10 according to FIG. 2 contains evaluation means 44 for evaluating the first temperature measurements and the second temperature measurements in order to decide whether a partial flame failure has occurred.

The evaluation means 44 according to FIGS. 1 and 2 are adapted to conduct the evaluation process described in the following:

The first temperatures $T1_{i,t}$ (i=1, 2, ..., n) are read out from the first temperature sensors 30a and 30b, respectively, wherein n is the number of first temperature sensors 30a and 30b, respectively, and t the current time step.

Therefrom the average temperature $$T1_{AVE,t} = \frac{1}{n}\sum_{i=1}^{n} T1_{i,t} \qquad (3)$$

is calculated. Therefrom the standard deviation $$S1_t = \sqrt{\frac{1}{n-1}\sum_{i=1}^{n}(T1_{i,t} - T1_{AVE,t})^2} \qquad (4)$$

is calculated.

As the next step, the rate of change of the standard deviation—$AS1_t'=d(S1_t)/dt$—is calculated using a numerical differentiation scheme:

$$AS1_t' = \frac{d(S1_t)}{dt} = \frac{\Delta S1_t}{\Delta t} = \frac{[S1_t - S1_{t-\Delta t}]}{\Delta t}, \qquad (5)$$

wherein t is the current time step, (t−Δt) is the previous time step and Δt is the sample period.

Next, a first detection parameter D1 being the smoothed rate of change of standard deviation is calculated as follows:

$$D1 = ES1_t' = w_1 * AS1_t' + d_1 * ES1_{t-\Delta t}', \qquad (6)$$

wherein: $ES1_t'$ is an estimated value for the rate of change of standard deviation between the first temperature measurements at different probing points 32a and 32b, respectively, for a current time step, $AS1_t'$ is an actual value for the standard deviation for a current time step, $ES1_{t-\Delta t}'$ is an estimated value for the standard deviation for the previous time step, $w_1$ is a weight factor, and $d_1 = (1-w_1)$ is a damping factor.

As a next step, D1 is compared with a threshold value.

Subsequently, the second temperatures are read from the second temperature sensors 42—$T2_{j,t}$, (j=1, 2, ..., m), where m is the number of second temperature sensors 42 and t is the current time step.

The respective rates of change for the second temperatures are calculated—$d(T2_{j,t})/dt$, using a numerical differentiation scheme:

$$AT2_{j,t}' = \frac{d(T2_{j,t})}{dt} = \frac{\Delta T2_{j,t}}{\Delta t} = \frac{[T2_{j,t} - T2_{j,t-\Delta t}]}{\Delta t}, \qquad (7)$$

where t is the current time step, (t−Δt) is the previous time step, and Δt is the sample period.

As the next step respective smoothed rates of change of the second temperatures are calculated:

$$ET2_{j,t}' = w_2 * AT2_{j,t}' + d_2 * ET2_{j,t-\Delta t}' \qquad (8)$$

where:
ET2$_t'$ is an estimated value for a first derivative of the current time step,
AT2$_t'$ is the actual value for the first derivative for the current time step,
ET2$_{t-\Delta t}'$ is an estimated value for the first derivative for the previous time step,
w$_2$ is a weight factor, and
d$_2$=(1−w$_2$) is a damping factor.

Subsequently, the average of the smoothed first derivatives of the second temperatures is calculated:

$$ET2'_{AVE,t} = \frac{1}{m}\sum_{j=1}^{m} ET2_{j,t} \quad (9)$$

As a next step, the standard deviation is calculated to be the second detection parameter D2:

$$ES2_t = \sqrt{\frac{1}{m-1}\sum_{j=1}^{m}(ET2'_{j,t} - ET2'_{AVE,t})^2} . \quad (10)$$

Next, D2 is compared to a respective threshold value.

If during the monitoring period D1 exceeds its predetermined threshold value for a predetermined number of consecutive samples and D2 also exceeds its predetermined threshold value for a predetermined number of consecutive samples, a partial flame failure is declared. Therefore, partial flame failure is detected only if both D1 and D2 exceed their threshold values. This approach is based on the correlated influence of a combustor on the first temperature sensors. Swirl effects—different distributions of the influence of a combustor on the first temperature sensors 30a and 30b, respectively, at different operating conditions can be ignored using this detection method due to the fact that the "pattern" of the gas duct temperature field is present with unique parameter—standard deviation of all first temperatures.

Individual second temperature sensors 42 on the burner tip and first temperature sensors 30a and 30b, respectively, in the gas duct can cause spurious detection of a can flameout, due to a temporary divergence of the first and second temperatures, such as in case of a flame pop-out event. To prevent this spurious detection, voting philosophy is applied, i.e. criteria requires both of the signals D1 and D2 to exceed the predetermined threshold values and in this way the detection method provides a very robust detection of the partial flame failure. Delays in detection criteria are advantageously introduced to prevent false detection in case of sudden picking in the D1 and D2 signals, which can be caused by temperature sensor measurement errors.

The invention claimed is:

1. A method of detecting a partial flame failure in a gas turbine engine, the gas turbine engine includes a gas duct to guide a propulsion gas and includes a plurality of combustors, the method comprising:
   measuring a first temperature over time at each of at least two probing points located in the gas duct downstream from the plurality of combustors;
   measuring a second temperature over time in each of at least two of a plurality of burners; and
   detecting a partial e failure from the first temperature measurement and the second temperature measurement,
   wherein each of the plurality of combustors leads into the gas duct and includes a burner, and
   wherein the detecting of the partial flame failure includes determining a first detection parameter, the first detection parameter is determined from a first rate of change of a first variation between a plurality of first temperature measurements at a plurality of different probing points whereby the first detection parameter is determined by calculating a smoothed first rate of change of a first variation,
   wherein the detecting of the partial flame failure further includes determining a second detection parameter, and
   wherein the second detection parameter is determined from a second variation between a plurality of second rates of change of a plurality of second temperature measurements in a plurality of different burners.

2. The method as claimed in claim 1,
   wherein the second detection parameter is determined by calculating a third variation of a plurality of smoothed second rates of change.

3. The method as claimed in claim 2,
   wherein the first detection parameter is compared to a first threshold,
   wherein the second detection parameter is compared to a second threshold, and
   wherein the partial flame failure is declared when the first detection parameter exceeds the first threshold and when the second detection parameter exceeds the second threshold.

4. The method as claimed in claim 3,
   wherein the partial flame failure is declared when the first detection parameter exceeds the first threshold for a first predetermined number of consecutive samples of the first detection parameter and when the second detection parameter exceeds the second threshold for a second predetermined number of consecutive samples of the second detection parameter.

5. The method as claimed in claim 1,
   wherein the second temperature is measured at a tip of the burner facing into the combustor.

6. The method as claimed in claim 1,
   wherein the gas turbine engine further includes a power turbine driven by the propulsion gas, the power turbine followed by an exhaust duct, and
   wherein the at least two probing points measuring the first temperature are located in an area of an exit of the power turbine opening into the exhaust duct.

7. The method as claimed in claim 1,
   wherein the gas turbine engine further includes a high-pressure turbine and a low-pressure turbine, each turbine is driven by the propulsion gas, and an interduct to guide the propulsion gas from the high-pressure turbine to the low-pressure turbine, and
   wherein the at least two probing points measuring the first temperature are located in the interduct.

8. A gas turbine engine, comprising:
   a gas duct, guiding a propulsion gas;
   a plurality of combustors, each leading into the gas duct, each combustor comprises:
   a burner; and
   an evaluation unit,
   wherein the gas duct includes a first temperature sensor at each of at least two probing points located downstream from the plurality of combustors, wherein each first temperature sensor is adapted for measuring a first temperature over time, wherein each of at least two of the burners includes a second temperature sensor to measure a second temperature over time, wherein the evaluation unit detects a partial flame failure from the first temperature measurement and the second temperature measurement, and wherein the evaluation unit uses a first detection parameter and a second detection parameter to determine when the partial flame failure occurs, and wherein the second detection parameter is determined from a second variation between a plurality of second rates of change of a plurality of second temperature measurements in a plurality of different burners.

9. A gas turbine engine as claimed in claim 8, wherein the first detection parameter is determined from a first rate of change of a first variation between a plurality of first temperature measurements at a plurality of different probing points.

10. The gas turbine engine as claimed in claim 8, wherein the first temperature sensor and the second temperature sensor each include a thermocouple.

11. The gas turbine as claimed in claim 8, wherein the gas turbine engine further includes a power turbine driven by the propulsion gas, the power turbine followed by an exhaust duct, and wherein the at least two probing points measuring the first temperature are located in an area of an exit of the power turbine opening into the exhaust duct.

12. The gas turbine as claimed in claim 11, wherein 12 first temperature sensors are located at the exit of the power turbine.

13. The gas turbine as claimed in claim 8, wherein the gas turbine engine further includes a high-pressure turbine and a low-pressure turbine, each turbine is driven by the propulsion gas, and an interduct to guide the propulsion gas from the high-pressure turbine to the low-pressure turbine, and wherein the at least two probing points measuring the first temperature are located in the interduct.

14. The gas turbine as claimed in claim 8, wherein 16 first temperature sensors are located in an interduct.

15. The gas turbine as claimed in claim 8, wherein the first detection parameter is compared to a first threshold, wherein the second detection parameter is compared to a second threshold, and wherein the partial flame failure is declared when the first detection parameter exceeds the first threshold and when the second detection parameter exceeds the second threshold.

16. The gas turbine as claimed in claim 8, wherein the second temperature is measured at a tip of each burner facing into the combustor.

* * * * *